US010167177B2

(12) United States Patent
Ishii et al.

(10) Patent No.: US 10,167,177 B2
(45) Date of Patent: Jan. 1, 2019

(54) CRANE, AND CRANE CONTROL METHOD

(71) Applicant: MITSUI ENGINEERING & SHIPBUILDING CO., LTD., Chuo-ku, Tokyo (JP)

(72) Inventors: Katsunori Ishii, Oita (JP); Koji Ohi, Oita (JP); Hiroshi Kubo, Oita (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 15/561,576

(22) PCT Filed: Mar. 24, 2016

(86) PCT No.: PCT/JP2016/059433

§ 371 (c)(1),
(2) Date: Sep. 26, 2017

(87) PCT Pub. No.: WO2015/158681

PCT Pub. Date: Oct. 6, 2016

(65) Prior Publication Data

US 2018/0086607 A1 Mar. 29, 2018

(30) Foreign Application Priority Data

Mar. 27, 2015 (JP) ................................ 2015-066087

(51) Int. Cl.

| | |
|---|---|
| ***G06F 7/00*** | (2006.01) |
| ***B66C 13/22*** | (2006.01) |
| ***B66C 9/10*** | (2006.01) |
| ***B66C 9/18*** | (2006.01) |
| ***B66C 9/12*** | (2006.01) |

(52) U.S. Cl.
CPC ................ *B66C 13/22* (2013.01); *B66C 9/10* (2013.01); *B66C 9/12* (2013.01); *B66C 9/18* (2013.01)

(58) Field of Classification Search
CPC .............. B66C 13/22; B66C 9/10; B66C 9/18
USPC ....................................... 701/50; 307/22, 19
See application file for complete search history.

(56) References Cited

U.S. PATENT DOCUMENTS 5,433,150 A * 7/1995 Long, Jr. ................... B66C 9/16
105/163.2
5,814,955 A * 9/1998 Bauer ...................... H02H 7/09
318/376
8,087,867 B2 * 1/2012 Tian ...................... B66C 19/002
212/318

(Continued)

FOREIGN PATENT DOCUMENTS

JP S62-89403 A 4/1987
JP H0558586 A * 3/1993 ............. H02P 27/06

(Continued)

*Primary Examiner* — Shardul D Patel
(74) *Attorney, Agent, or Firm* — Carrier Blackman & Associates, P.C.; Joseph P. Carrier; Fulchand P. Shende

(57) ABSTRACT

Provided is a crane which can suppress deformation and vibration of a crane structure in travel and stop of the crane. Inverters are installed respectively in travel devices which are arranged on the opposite sides with a gap in a transverse direction. Each of the inverters independently measures a torque generated in a motors to which the inverter is connected and reduces the rotation speed in the command from a controller to the motor such that the greater the measured torque is, the greater a ratio of reduction is.

14 Claims, 5 Drawing Sheets

(56) References Cited

U.S. PATENT DOCUMENTS

| | | | | |
|---|---|---|---|---|
| 2008/0252417 | A1* | 10/2008 | Thomas | B66C 13/46<br>340/10.1 |
| 2010/0282557 | A1* | 11/2010 | He | B66C 13/12<br>191/33 R |
| 2012/0089287 | A1* | 4/2012 | Nishiyama | B66C 13/12<br>701/22 |
| 2013/0311053 | A1* | 11/2013 | Hakkarainen | B66C 9/16<br>701/50 |

FOREIGN PATENT DOCUMENTS

| | | | |
|---|---|---|---|
| JP | H10-248293 | A | 9/1998 |
| JP | 2013-023294 | A | 2/2013 |
| JP | 2014-118303 | A | 6/2014 |

* cited by examiner

CRANE, AND CRANE CONTROL METHOD

TECHNICAL FIELD

The invention of the present application relates to a crane including travel devices which are arranged on the opposite sides with a gap in a transverse direction and a crane structure which is supported by the travel devices, more specifically to a crane which can suppress deformation and vibration of the crane structure when the crane travels and stops.

BACKGROUND ART

A quay crane is used as a loading-unloading machine for loading and unloading containers and the like in places such as ports. The quay crane includes travel devices which are arranged on the opposite sides with a gap in a transverse direction (also referred to as sea-land direction) being a horizontal direction orthogonal to a travel direction along the quay, a crane structure which is supported by the travel devices, and a boom which is supported by the crane structure and which extends in the transverse direction. The travel devices include a sea-side travel device arranged on the sea side and a land-side travel device arranged on the land side.

The sea-side travel device and the land-side travel device each have a travel wheel, a motor which transmits power to the travel wheel, an inverter which is connected to the motor and which controls a rotation speed (number of revolutions) of the motor, and a controller which gives a rotation speed command to the motor via the inverter.

The controllers are installed for example in an operator cabin of the crane and each give the speed command to the corresponding inverter when being operated by an operator. Each inverter supplies the corresponding motor with electric power whose frequency and voltage are adjusted based on the speed command. In other words, the sea-side travel device and the land-side travel device are controlled independently.

When a typhoon approaches, anchoring pins are inserted into through holes formed in the travel devices and the quay to fix the quay crane to the quay. To allow the through holes in the sea-side travel device to be aligned with those in the quay and to allow the through holes in the land-side travel device to be aligned with those in the quay in such event, the sea-side travel device and the land-side travel device are configured to be independently controllable.

In loading and unloading of containers with the quay crane, the operator causes the quay crane to travel in the travel direction and performs alignment such that the center of a container to be loaded or unloaded is aligned with the center of the boom. In the case of causing the quay crane to travel, the operator operates the controllers such that the sea-side travel device and the land-side travel device travel in the same direction at the same speed.

In the case of stopping the quay crane, the operator first gradually reduces the speed of each motor to 2% of a rated rotation speed of the motor which is 100% and then stops the travel devices by activating brake devices provided in the travel devices. When the speed of the motor is reduced to 0% of the rated rotation speed, that is to 0 rpm, the quay crane is sometimes pushed and moved by wind or the like. Accordingly, the brakes have been conventionally applied before the travel devices come to complete stop.

Since the quay crane has a boom protruding toward the sea, the center of gravity of the quay crane is offset toward the sea and the load (hereafter, sometimes referred to as wheel load) to be supported by the sea-side travel device is greater than the load to be supported by the land-side travel device. The applicant has found that, since the wheel load in the sea-side travel device is greater, the sea-side travel device with a relatively large wheel load falls behind the land-side travel device even when the speed commands to travel at the same speed are given from the controllers to the sea-side travel device and the land-side travel device.

When the quay crane is made to travel, the land-side travel device moves ahead of the sea-side travel device, that is, the positions of the respective travel devices are misaligned in the travel direction. The misalignment of the sea-side travel device and the land-side travel device in the travel direction generates a rotation moment about an axis extending in an up-down direction in the crane structure and strain (deformation) is generated in the crane structure. Moreover, a rotation moment in the opposite direction to the aforementioned rotation moment is generated in the crane structure as force in a direction in which the strain is released. This rotation moment causes vibration in the crane structure and the vibration causes a trouble of swinging of a boom front end in the travel direction.

Moreover, when the travel devices are stopped by applying the brakes, since the sea-side travel device and the land-side travel device are misaligned in the travel direction, the positions of the travel devices are fixed with residual strain remaining in the crane structure. Vibration occurs in the crane structure after the braking due to the effect of the strain and causes the trouble of swinging of the boom front end in the travel direction.

Booms of quay cranes include booms having a twin-box structure in which two beam-shaped members extending in the transverse direction are connected by steel members extending in the travel direction to form a frame-shaped structure and booms having a mono-box structure formed of one beam-shaped member. The booms having the mono-box structure are lighter than the booms having the twin-box structure, but have relatively low stiffness to swinging in the travel direction. Thus, the boom front end tends to swing in the mono-box structure.

Since alignment with a container to be loaded or unloaded cannot be performed in a state where the boom front end is swinging, in a conventional crane, the operator must wait until the swinging of the boom front end settles. This waiting time is necessary every time the quay crane travels and stops.

The applicant has already proposed a damping structure which suppresses swinging of a boom of a quay crane (see, for example, Patent Document 1). Patent Document 1 proposes a configuration in which damping masses are provided in a sea-side end portion of the boom and a land-side end portion of a girder to suppress swinging of the boom occurring in an earthquake. Although the damping masses can reduce the swinging of the boom which occurs in travel and stop of the quay crane, the damping masses cannot prevent the occurrence of the swinging of the boom itself. Accordingly, the waiting time is still necessary.

PRIOR ART DOCUMENT

Patent Document

Patent Document 1: Japanese patent application Kokai publication No. 2011-213455

SUMMARY OF THE INVENTION

Problem to be Solved by the Invention

The present invention has been made in view of the problems described above and an object thereof is to provide a crane which can suppress deformation and vibration of a crane structure in travel and stop of a crane.

Means for Solving the Problem

The crane of the present invention for achieving the aforementioned object includes travel devices which are arranged on the opposite sides with a gap in a transverse direction crossing a travel direction and a crane structure which is supported by the travel devices, the travel devices each including a travel wheel, a motor which transmits power to the travel wheel, an inverter which is connected to the motor and which controls a rotation speed of the motor, and a controller which gives a command of the rotation speed to the motor via the inverter, the crane characterized in that each of the inverters includes a torque measurement unit which measures a torque generated in the motor to which the inverter is connected and a control unit which reduces the rotation speed in the command from the controller to the motor such that the greater a value of the torque obtained by the torque measurement unit is, the greater a ratio of reduction is, and the inverters independently perform measurement with the torque measurement units and the control with the control units.

A crane control method of the present invention is a method of controlling a crane including travel devices which are arranged on the opposite sides with a gap in a transverse direction crossing a travel direction and a crane structure which is supported by the travel devices, the travel devices each including a travel wheel, a motor which transmits power to the travel wheel, an inverter which is connected to the motor and which controls a rotation speed of the motor, and a controller which gives a command of the rotation speed to the motor via the inverter, characterized in that the method comprises: causing each of the inverters to independently measure a torque generated in the motor to which the inverter is connected and reduce the rotation speed in the command from the controller to the motor such that the greater the measured torque is, the greater a ratio of reduction is, so as to reduce misalignment in the travel direction between the travel devices arranged on the opposite sides.

Effects of the Invention

In the present invention, the rotation speed in the command to the motor is reduced such that the greater the torque of the motor measured by the torque measurement unit is, the greater the ratio of the reduction is. Accordingly, the torques generated in the motors are controlled to be even. Making the torques generated in the motors even can reduce misalignment in the travel direction between the travel devices arranged on the opposite sides. Accordingly, strain is less likely to be generated in the crane structure and the present invention is advantageous in suppressing vibration occurring in the crane structure due to this strain.

The crane can be configured to include a brake device configured to apply a brake to the travel devices after a predetermined waiting time elapses from a point where a speed command of maintaining the rotation speed to zero is given from the controller to the motors. In this configuration, the brake is applied to the travel devices after the rotation speeds of the motors are maintained at zero and the magnitudes of the torques generated in the respective motors are made even by the control units, that is after the misalignment in the travel direction between the travel devices arranged on the opposite sides is reduced. Accordingly, the present invention is advantageous in suppressing vibration occurring due to the strain in the crane structure after the braking.

The crane is a quay crane and the crane structure can be configured to include a boom extending in the transverse direction. The present invention is advantageous in suppressing swinging of the boom front end in the travel direction in the travel and stop of the crane.

MODES FOR CARRYING OUT THE INVENTION

Figure 1:
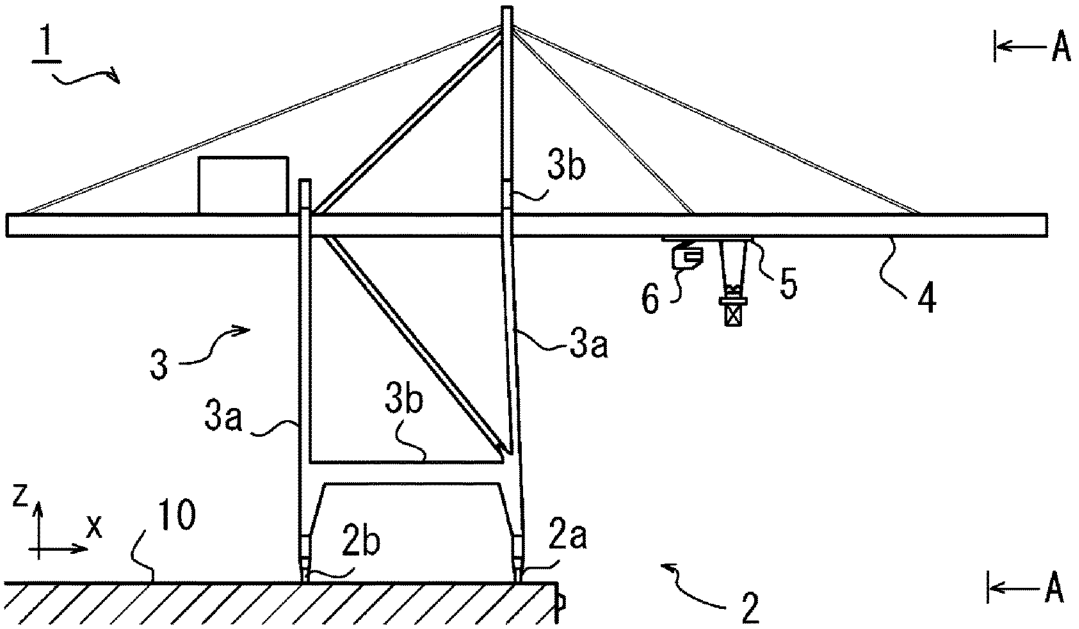
FIG. 1 is an explanatory view illustrating a crane of the present invention.
Figure 2:
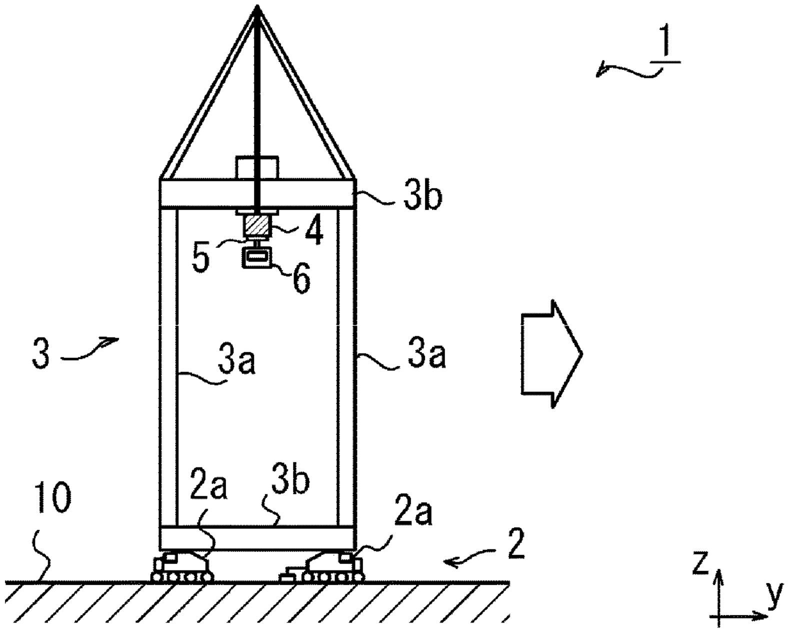
FIG. 2 is an explanatory view illustrating the crane of FIG. 1 along the cross-section A-A.
Figure 3:
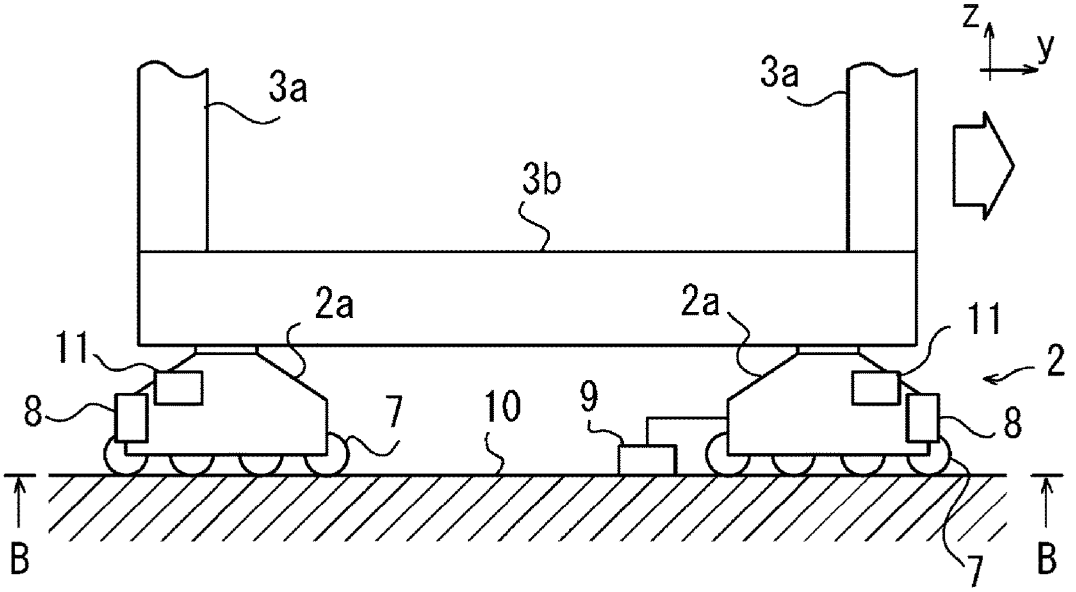
FIG. 3 is an explanatory view illustrating a portion around travel devices of the crane of FIG. 2 in an enlarged manner.

A crane and a crane control method of the present invention are described below based on the embodiments illustrated in the drawings. Note that, in the drawings, a travel direction of the crane and travel devices is illustrated by an arrow y, a transverse direction which is a horizontal direction orthogonal to the travel direction y is illustrated an arrow x, and an up-down direction is illustrated by an arrow Z.

As illustrated in FIGS. 1 to 4, a crane 1 of the present invention is configured to be, for example, a quay crane. The quay crane 1 includes travel devices 2 each two of which are arranged on the opposite sides with a gap in the transverse direction x being the horizontal direction orthogonal to the travel direction y of the crane 1, a crane structure 3 which is supported by the travel devices 2, and a boom 4 which is supported by the crane structure 3 and which extends in the transverse direction x.

The crane structure 3 includes four leg members **3*a* extending in the up-down direction z and multiple horizontal members 3*b* each extending in the transverse direction x or the travel direction y to connect the adjacent leg members 3*a* to each other. The crane 1 includes a trolley 5 which transversely moves along the boom 4, and an operator operates the crane 1 from an operator cabin 6 provided together with the trolley 5**.

The travel devices 2 are installed at a lower end of the crane structure 3 and include two sea-side travel devices **2*a* arranged on the sea side to be aligned in the travel direction y and two land-side travel devices 2*b* arranged on the land side to be aligned in the travel direction y. Although the crane structure 3 is provided with the two sea-side travel devices 2***a* and the two land-side travel devices 2*b* in the embodiment, the present invention is not limited to this configuration. The crane 1 of the present invention only has to include at least two travel devices 2 arranged with a gap in the transverse direction x.

Each of the travel devices 2 includes four travel wheels 7 and one motor 8 which transmits power to the travel wheels 7. Moreover, at least one of the travel devices 2 are provided with brake devices 9 which apply brakes to the travel devices 2.

The travel wheels 7 are configured to be, for example, iron wheels or the like which move while rolling on rails laid on a quay 10. In this case, the brake devices 9 are configured to be, for example, rail clamps which hold the rails to fix the travel devices 2. Alternatively, the travel wheels 7 are configured to be, for example, rubber tires or the like which move without rails by rolling on the quay 10. In this case, the brake devices 9 are configured to be disc brakes or the like which stop rotation of the tires.

The number of the travel wheels 7 and the number of the motors 8 are not limited to those described above. The number of the travel wheels 7 can be changed as appropriate depending on load to be supported by the travel wheels 7, and the number of the motors 8 can be changed as appropriate depending on the magnitude of the power to be transmitted to the travel wheels 7. For example, the configuration may be such that one travel device 2 is provided with eight travel wheels 7 and four motors 8 transmit power to these travel wheels 7.

Moreover, the travel devices 2 include inverters 11. The inverters 11 control the rotation speeds (numbers of revolutions) of the motors 8 based on rotation speed commands from a controller installed in the operator cabin 6.

Figure 5:
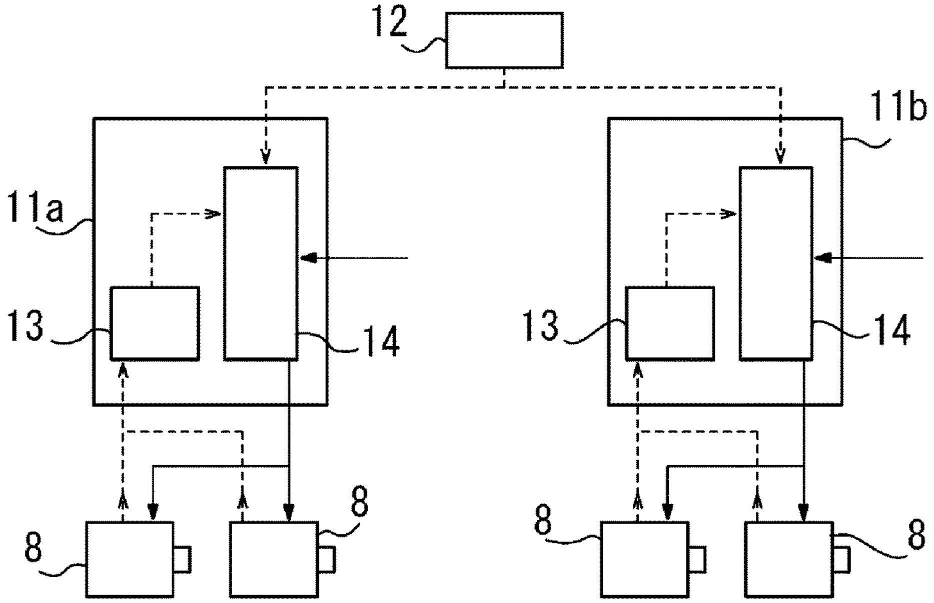
FIG. 5 is an explanatory view schematically illustrating inverters mounted in the crane.

As illustrated in FIG. 5, the inverters 11 include a sea-side inverter 11*a* which controls the motors 8 installed in the sea-side travel devices 2*a* and a land-side inverter 11*b* which controls the motors 8 installed in the land-side travel devices 2*b*. The inverters 11 are installed in the travel devices 2. A controller 12 which gives rotation speed commands to the motors 8 via the inverters 11 is installed in, for example, the operator cabin 6.

The configuration is not limited to this and the inverters 11 may be installed in the operator cabin 6 together with the controller 12. Moreover, when the crane 1 is remotely operated, the controller 12 is installed in an operator cabin at a remote location.

The configuration may be such that one sea-side inverter 11*a* controls all motors 8 installed in the sea-side travel devices 2*a* and one land-side inverter 11 controls all motors 8 installed in the land-side travel devices 2*b*, or may be such that the inverter 11 is provided for each motor 8.

Each of the inverters 11 includes a torque measurement unit 13 which measures a torque generated in each of the motors 8 connected to the inverter 11 and a control unit 14 which adjusts the frequency and the like of electric power to be sent to each of the motors 8 depending on a value obtained by the torque measurement unit 13. Note that, in FIG. 5, electric power lines for supplying electric power to the motors 8 are illustrated by arrows of solid lines and signal lines for transmitting signals are illustrated by arrows of broken lines.

When the operator operates the controller 12, the speed command is sent from the controller 12 to the control units 14 of the inverters 11. The speed command is a command specifying the rotation speed of the motors 8, and the control unit 14 adjusts the frequency and the like of the electric power to be supplied from the crane 1 according to the speed command and supplies the electric power to the motors 8. In other words, the motors 8 rotate according to the rotation speed in the command from the controller 12.

In the embodiment, one controller 12 is connected to the two inverters 11*a*, 11*b*. The controller 12 may be configured to be provided with a switch for selecting the inverter 11 to which the rotation speed command is to be sent so that only the sea-side travel devices 2*a* or the land-side travel devices 2*b* can be made to travel and aligned. Alternatively, the configuration may be such that two controllers 12 are connected respectively to the two inverters 11.

The torque measurement unit 13 of each inverter 11 measures the torque generated in each motor 8 from time to time and sends the measurement value to the control unit 14. The control unit 14 performs from time to time control of reducing the rotation speed in the command from the controller 12 to the motor 8 such that the greater the value of the measured torque is, the greater the ratio of the reduction is. The ratio by which the rotation speed is reduced with respect to the value of the measured torque is set in advance in the control unit 14.

The amount (correction amount) by which the actual rotation speed is to be reduced from the speed command sent from the controller 12 to the motor 8 can be determined based on, for example, Math $D=aT/100$. In this Math, D is the correction amount (%), a is a constant set in advance, T is the ratio (%) of the measured torque with respect to the rated torque of the motor 8. In other words, the correction amount D by which the rotation speed in the command from the controller 12 to the motor 8 is reduced increases in proportion to the value of the measured torque.

Description is given by using an example in which the constant a is set to 3. When the torque of the motor 8 measured by the torque measurement unit 13 is equal to the rated torque of the motor 8 (T=100%), the correction amount D is 3% as calculated from the aforementioned Math. Accordingly, the control unit 14 causes the motor 8 to rotate at a speed obtained by subtracting 3% from the rotation speed inputted on the controller 12 by the operator. Specifically, when the rotation speed command is 100% (rated speed), the motor 8 actually rotates at 97% of the rated speed and, when the rotation speed command is 50%, the motor 8 actually rotates at a rotation speed 47% of the rated speed.

When the torque of the motor 8 measured by the torque measurement unit 13 is 50% of the rated torque (T=50%), the control unit 14 causes the motor 8 to rotate at a rotation speed obtained by subtracting 1.5% from the rotation speed inputted on the controller 12 by the operator. Specifically, when the rotation speed command is 100% (rated speed), the motor 8 actually rotates at a rotation speed 98.5% of the rated speed and, when the rotation speed command is 50%, the motor 8 actually rotates at a rotation speed 48.5% of the rated speed.

When the measured torque of the motor 8 is 200% of the rated torque (T=200%), the control unit 14 causes the motor 8 to rotate at a rotation speed obtained by subtracting 6.0% from the rotation speed inputted on the controller 12 by the operator. Specifically, when the rotation speed command is 100% (rated speed), the motor 8 actually rotates at a rotation speed 94% of the rated speed and, when the speed command is 50%, the motor 8 actually rotates at a rotation speed 44% of the rated speed.

The value of the constant a is not limited to that described above and can be changed as appropriate depending on the size of the crane and the configurations of the devices. The value of the constant a is set within a range of 1 or more and 20 or less, preferably within a range of 2 or more and 6 or less. The controller 12 may be configured to be provided with a control knob for changing the constant a to allow the operator to change the constant a as necessary.

The crane 1 may be configured such that a predetermined torque value other than the rated torque of the motor 8 is used as the reference value to obtain the ratio T of the torque measured by the torque measurement unit 13. Moreover, for example, the crane 1 may be configured such that the rotation of the rotation speed of the motor 8 is controlled by using a correction rate determined in advance for the speed command. Specifically, for example, when the correction ratio is 10% for the speed command of 100% of the rated speed, the motor 8 is controlled to rotate at a rotation speed 90% of the speed command. In this case, when the speed command is 100% of the rated speed, the rotation speed of the motor 8 is set to 90% of the rated speed and, when the speed command is 50% of the rated speed, the rotation speed of the motor 8 is set to 45% of the rated speed.

The correction amount D by which the rotation speed of the motor 8 is reduced depending on the value of the torque measured by the torque measurement unit 13 is not limited to the aforementioned amount. The control unit 14 only has to be set to reduce the rotation speed such that the greater the value of the measured torque is, the greater of the ratio of the reduction is. For example, instated of using the aforementioned Math for obtaining the correction amount D, a table may be set in which the correction amount D is predetermined depending on the ratio of the generated torque with respect to the rated torque of the motor 8 as illustrated in Table 1. The aforementioned math and table for determining the rotation speed of the motor 8 can be stored in, for example, the control unit 14.

TABLE 1

| Ratio [%] of measured torque with respect to rated torque of motor | Correction amount [%] with respect to speed command |
|---|---|
| Less than 100% | 0% |
| 100% or more and less than 150% | 4% |
| 150% or more and less than 200% | 6% |
| 200% or more | 8% |

The sea-side inverter 11*a* and the land-side inverter 11*b* independently perform the torque measurement with the torque measurement units 13 and the control of the rotation speeds of the motors 8 with the control units 14. In other words, in the present invention, when the torque measurement and the control of the rotation speeds of the motors 8 are performed, no signals are exchanged between the inverters 11 relating to the measurement and the control.

Figure 6:
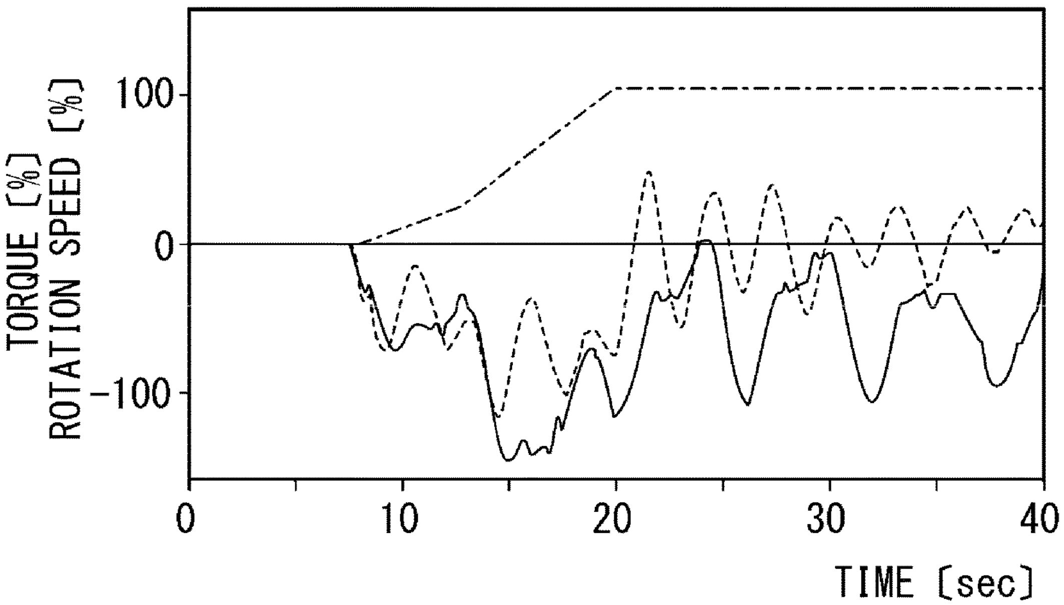
FIG. 6 is a graph illustrating torque fluctuation of a motor in a crane of a comparative example.

Next, an experiment performed to check effects of the present invention is described. In a comparative example, the experiment was performed by causing an actual quay crane including no control units 14 to travel and measuring a torque generated in each of motors. The graph illustrated in FIG. 6 depicts results of this experiment. The vertical axis of the graph indicates the measured torques (%) expressed on the basis that the rated torque of the motors is taken as 100% and the rotation speeds (%) of the motor expressed on the basis that the rated speed of the motors is taken as 100%, and the horizontal axis of the graph indicates the elapsed time (sec). A one-dot chain line indicates the rotation speed of the motors, a solid line indicates the measured torque of the motor installed in a sea-side travel device, and a broken line indicates the measured torque of the motor installed in a land-side travel device.

Figure 4:
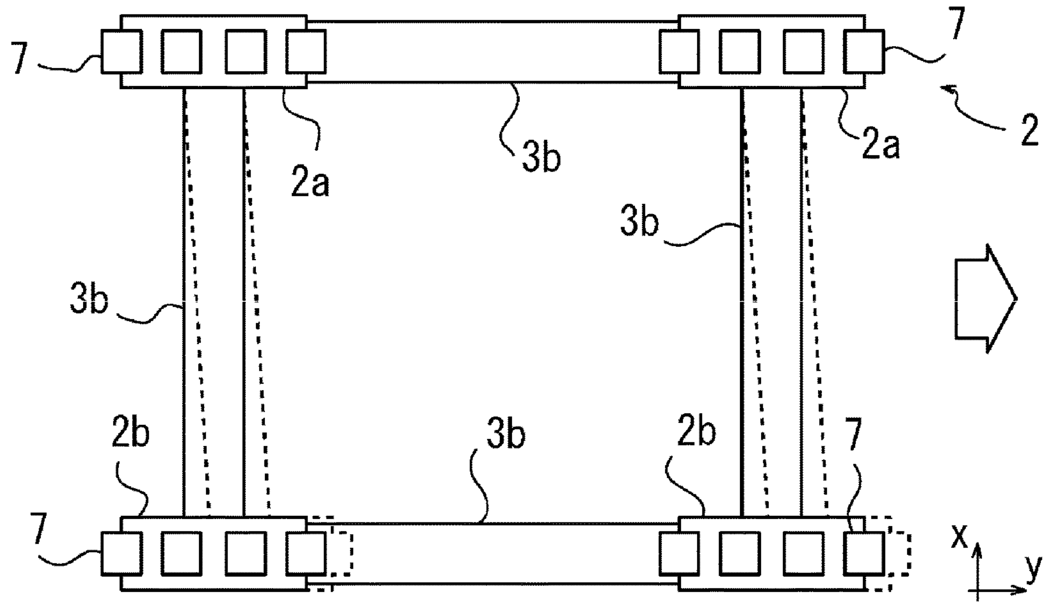
FIG. 4 is an explanatory view illustrating the crane of FIG. 3 as viewed in the direction of arrows B-B.

As illustrated in FIG. 6, a ratio of the torque measured by the torque measurement unit is greater than 0% and less than 150% with respect to the rated torque of the motor which the inverter is connected. As also shown, the torque generated in the motor in the land-side travel device which is illustrated by the broke line is greater than the torque generated in the motor in the sea-side travel device which is illustrated by the solid line. This is because, when the command for the same rotation speed as the land-side travel device is given from the controller to the sea-side travel device in the travel of the quay crane, the sea-side travel device 2*a* with a relatively large wheel load falls behind the land-side travel device 2*b* as illustrated by the broken line in FIG. 4. Specifically, the sea-side travel device and the land-side travel device are misaligned in the travel direction y and the leading land-side travel device travels in such a way as to drag the sea-side travel device. Accordingly, the torque generated in the motor in the land-side travel device becomes greater. Note that a white arrow in FIG. 4 illustrates the travel direction of the quay crane.

Moreover, as illustrated in FIG. 6, it is found that a relationship between a phase of torque fluctuation occurring in the motor in the sea-side travel device and that in the land-side travel device is frequently reversed. This means that the sea-side travel device and the land-side travel device repeatedly come close to each other and move away from each other in the travel direction y and that compressive force and tensile force in the travel direction y are alternately generated in the crane structure. The misalignment between the sea-side travel device and the land-side travel device in the travel direction y causes the crane structure to deform and vibration is generated. When the crane structure vibrates, particularly a front end of the boom swings greatly in the travel direction.

Figure 7:
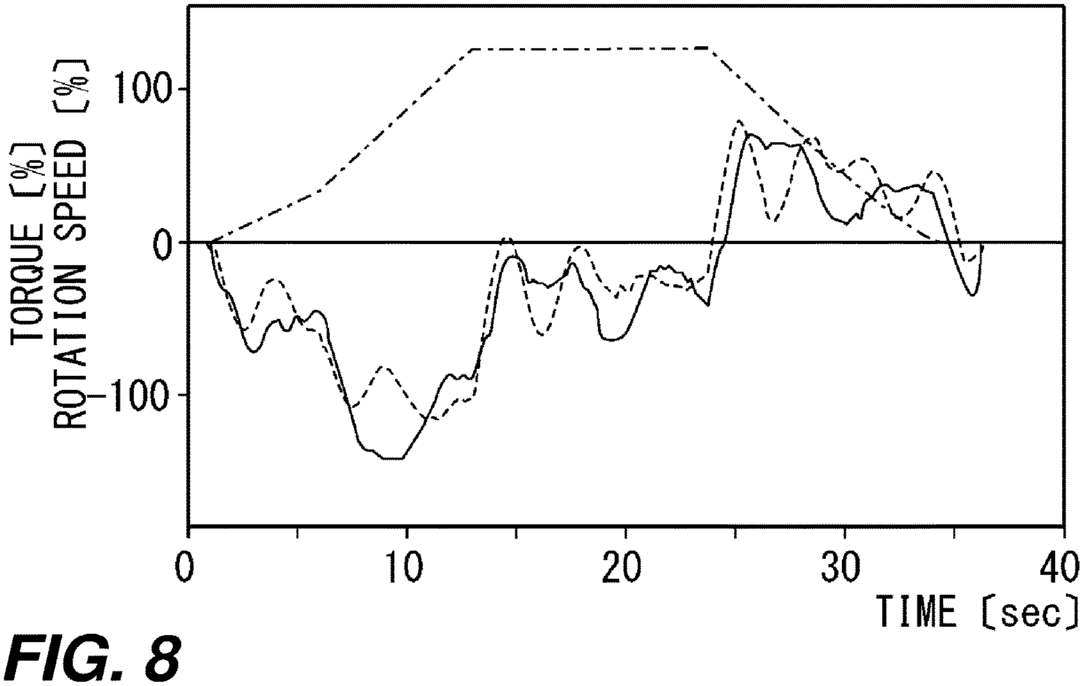
FIG. 7 is a graph illustrating torque fluctuation in a motor in a crane of an example.

The same experiment as that for the comparative example was performed for the quay crane 1 of an example of the present invention. The graph illustrated in FIG. 7 depicts results of this experiment. As illustrated in FIG. 7, a ratio of the torque measured by the torque measurement unit is greater than 0% and less than 150% with respect to the rated torque of the motor which the inverter is connected. As also shown, there is almost no difference between the magnitude of the torque generated in the motor 8 in one of the sea-side travel devices 2*a* and the magnitude of the torque generated in the motor 8 of the corresponding land-side travel device 2*b*. If one travel device 2 is located at a position leading another travel device 2, large torque is generated in the motor 2 of the leading travel device 2. However, since the rotation speed of this motor 8 is reduced by the correction amount D, the position of the travel device 2 is controlled in such a direction that the leading state is canceled out. Accordingly, almost no misalignment between the sea-side travel device 2*a* and the land-side travel device 2*b* in the travel direction y occurs in the travel of the quay crane 1, and the crane 1 travels with the positions of the travel devices 2 relative to each other maintained.

As illustrated in FIG. 7, when a control of the control units is performed within a range in which a ratio of the torque measured by the torque measurement unit is greater than 0% and less than 150% with respect to the rated torque of the motor which the inverter is connected it is found that a phase of torque fluctuation occurring in the motor 8 of the sea-side travel device 2*a* is almost synchronized with a phase of torque fluctuation occurring in the motor 8 in the land-side travel device 2*b*. This means that the sea-side travel device 2*a* and the land-side travel device 2*b* are generating force for the crane structure 3 simultaneously in the same direction in the travel direction y. Since there is almost no misalignment between the travel devices 2 in the travel direction y and the phases of the torque fluctuations are synchronized, almost no strain is generated in the crane structure 3. Accordingly, the vibration occurring in the travel of the quay crane 1 can be suppressed.

The width of swing of the boom front end in the travel of the quay crane was measured. When the width of swing of the boom front end in the travel direction y in the quay crane of the comparative example is taken as 100, the index thereof in the quay crane 1 of the example is 15 to 45. Here, the smaller the value of the index is, the smaller the width of swing is.

Figure 8:
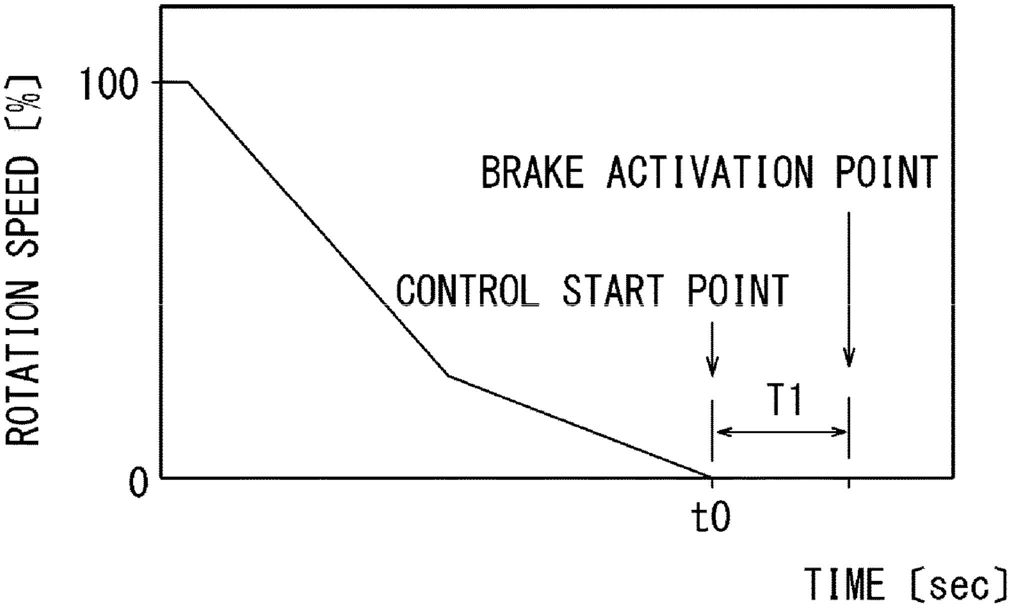
FIG. 8 is a graph illustrating fluctuation in a rotation speed of a motor in braking.

When the quay crane 1 is to be stopped, the operator sends a speed command for setting the rotation speeds of the motor 8 to 0% of the rated rotation speed, that is 0 rpm, from the controller 12 to the control units 14. As illustrated in FIG. 8, the controllers 14 gradually reduce the speeds of the motors 8 and start control of maintaining 0 rpm at a time point t0 where the rotation speeds fall to 0 rpm (control start point). For example, when the quay crane 1 is pushed in the travel direction y by wind or the like, the motors 8 are made to generate force opposite to this external force to maintain the rotation speeds of the motors 8 at 0 rpm. After predetermined waiting time T1 of about, for example, 2 to 10 sec elapses from the time point where the rotation speeds of the motors 8 fall to 0 rpm, the brake devices 9 provided in the travel devices 2 apply the brake (brake activation point).

Also during the elapse of this waiting time T1, the inverters 11 measure the torque of the motors 8 with the torque measurement units 13 and perform from time to time the control of reducing the rotation speed in the command to each motor 8 such that the greater the value of the torque is, the greater the ratio of the reduction is. Accordingly, also after the start of the control of setting the rotation speeds of the motors 8 to 0 rpm, if each of the sea-side travel device 2*a* and the corresponding land side travel device 2*b* are misaligned in the travel direction y and strain is generated in the crane structure 3, the travel devices 2 generate force in such a direction that this strain is released. As illustrated in FIG. 4, when the sea-side travel devices 2*a* are at rear positions as illustrated by broken lines and the land-side travel devices 2*b* are at leading positions in the travel of the quay crane 1 in the direction of the white arrow, force in such a direction that the land-side travel devices 2*b* approach the sea-side travel devices 2*a* in the travel direction y is generated in the motors 8 of the land-side travel devices 2*b*.

When the torques are generated in the motors 8 of the land-side travel devices 2*b* due to this force, the control unit 14 performs control of reducing the rotation speeds of the motors 8 depending on the magnitude of the torque. In this case, the speed command to stop at the rotation speed of 0% with respect to the rated rotation speed is given from the controller 12 to the motors 8. Accordingly, for example, when the torque generated in each motor 8 is 100% of a predetermined reference value, the control unit 14 performs control of causing the motors 8 to rotate at a rotation speed obtained by subtracting 3% from the speed command, that is −3% of the rated rotation speed. In other words, the motors 8 of the land-side travel devices 2*b* rotate in a reverse direction and move in a direction approaching the sea-side travel devices 2*a*.

Since the travel devices 2 move such that the torques generated in the motors 8 decrease, the misalignment between the travel devices 2 in the travel direction y decreases. In other words, residual strain in the crane structure 3 is released and then the travel devices 2 are fixed by the brake devices 9. Accordingly, it is possible to suppress occurrence of vibration in the crane structure 3 after the braking and swinging of the boom front end in the travel direction y.

The timing at which the brakes are applied is not limited to the timing after elapse of the waiting time T1. For example, the crane 1 may be configured such that the rotation speeds of the motors 8 and the travel speeds of the travel devices 2 are monitored by using a speedometer and the like and the brake devices 9 are activated when the rotation speeds of all motors 8 become zero or the travel speeds of the travel devices 2 become 0 m/min. In this configuration, it is possible to fix the travel devices 2 with the brakes when the misalignment between the travel devices 2 in the travel direction y is eliminated and the travel devices 2 are stopped. The brakes are thus applied after the strain in the crane structure 3 is completely released. This is advantageous in suppressing the vibration after the stop of the crane 1.

An experiment was performed to measure the width of swing of the boom front end after the traveling quay crane was stopped by applying the brakes. When the width of swing of the boom front end in the travel direction y in the quay crane of the comparative example including no control unit 14 is taken as 100, the index thereof in the quay crane 1 of the example is 13 to 38. The smaller the value of the index is, the smaller the width of swing is.

Since the present invention can suppress generation of strain in the crane structure and vibration of the crane structure in the travel and the stop of the crane 1, the boom front end hardly swings during the waiting time T1. Accordingly, the operator can align the boom 4 with a container to be loaded or unloaded also in the waiting time T1, and perform preparation for starting loading-unloading work before the application of the brakes. Since time waiting for the swinging of the boom to settle is unnecessary, the present invention is advantageous in improving loading-unloading efficiency.

Application of the present invention can greatly suppress the swinging of the boom front end also in a quay crane employing a boom with a mono-box structure for weight reduction. Moreover, application of the present invention can suppress the swinging of the boom front end also in a quay crane including a boom with a large overall length due to an increase in size of the crane.

Figure 9:
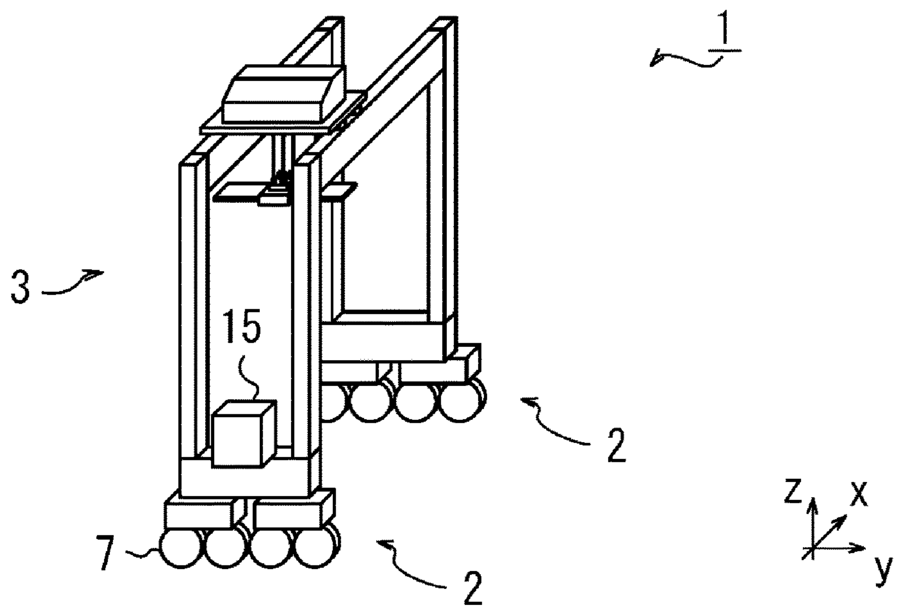
FIG. 9 is an explanatory view illustrating another embodiment of the crane.

As illustrated in FIG. 9, the crane 1 of the present invention may be configured to be also, for example, a gantry crane. The crane 1 of the present invention is not limited to this type of crane and can be applied to other types of cranes which include travel devices arranged with a gap in the transverse direction x.

In the gantry crane 1, the wheel load in one travel device 2 is sometimes greater than that in the other because a diesel power generator 15 is arranged on one of the travel devices 2 or the gantry crane 1 travels with a container being suspended. By employing the inverters 11 each including the torque measurement unit 13 and the control unit 14, it is possible to suppress misalignment between the travel devices 2 in the travel direction y and suppress vibration of the crane 1.

In the gantry crane 1 in which the travel wheels 7 are rubber tires, when the travel devices 2 are misaligned in the travel direction y, strain is generated in the crane structure 3 and a rotation moment about an axis extending in the up-down direction is generated. When the gantry crane 1 is made to travel in such a condition, the crane 1 travels while turning in a rotating direction of this rotation moment.

Since the present invention can reduce the misalignment between the travel devices 2 in the travel direction y, the present invention is advantageous in improving the straight line stability in travel. Since the straight line stability of the gantry crane 1 in the travel can be improved, the present invention is advantageous in automation of the travel.

EXPLANATION OF REFERENCE NUMERALS

1 crane
2 travel device
2*a* sea-side travel device
2*b* land-side travel device
3 crane structure
3*a* leg member
3*b* horizontal member
4 boom
5 trolley
6 operator cabin
7 travel wheel
8 motor
9 brake device
10 quay
11 inverter
11*a* sea-side inverter
11*b* land-side inverter
12 controller
13 torque measurement unit
14 control unit
15 diesel power generator

The invention claimed is:

1. A crane including travel devices which are arranged on opposite sides with a gap in a transverse direction crossing a travel direction and a crane structure which is supported by the travel devices, the travel devices each including a travel wheel, a motor which transmits power to the travel wheel, an inverter which is connected to the motor and which controls a rotation speed of the motor, and a controller which gives a command of the rotation speed to the motor via the inverter, wherein each of the inverters includes a torque measurement unit which measures a torque generated in the motor to which the inverter is connected and a control unit which reduces the rotation speed in the command from the controller to the motor such that the greater a value of the torque obtained by the torque measurement unit is, the greater a ratio of reduction with respect to the rotation speed in the command is, a control of each of the control units is performed within a range in which a ratio of the torque measured by the torque measurement unit is greater than 0% and less than 150% with respect to a rated torque of the motor to which the inverter is connected, and the inverters independently perform measurement with the torque measurement units and the control with the control units.

2. The crane according to claim 1, comprising a brake device configured to apply a brake to the travel devices after a predetermined waiting time elapses from a point where a speed command of maintaining the rotation speed to zero is given from the controller to the motors.

3. The crane according to claim 1, wherein the crane is a quay crane and the crane structure includes a boom extending in the transverse direction.

4. A method of controlling a crane including travel devices which are arranged on opposite sides with a gap in a transverse direction crossing a travel direction and a crane structure which is supported by the travel devices, the travel devices each including a travel wheel, a motor which transmits power to the travel wheel, an inverter which is connected to the motor and which controls a rotation speed of the motor, and a controller which gives a command of the rotation speed to the motor via the inverter, comprising:

causing each of the inverters to independently measure a torque generated in the motor to which the inverter is connected and reduce the rotation speed in the command from the controller to the motor such that the greater the measured torque is, the greater a ratio of reduction with respect to the rotation speed in the command is, so as to reduce misalignment in the travel direction between the travel devices arranged on the opposite sides, wherein the reduction of the rotation speed in the command is effected by the inverters within a range in which a ratio of the torque measured by the torque measurement unit is greater than 0% and less than 150% with respect to a rated torque of the motor to which the inverter is connected.

5. The method of controlling the crane according to claim 4, comprising:

applying a brake to the travel devices after a predetermined waiting time elapses from a point where a speed command of maintaining the rotation speed to zero is given from the controller to the motors.

6. The method of controlling the crane according to claim 4, wherein the crane is a quay crane and the crane structure includes a boom extending in the transverse direction.

7. The crane according to claim 2, wherein the crane is a quay crane and the crane structure includes a boom extending in the transverse direction.

8. The method of controlling the crane according to claim 5, wherein the crane is a quay crane and the crane structure includes a boom extending in the transverse direction.

9. The crane according to claim 1, wherein a center of gravity of the crane is offset to be closer to one of the travel devices than the other.

10. The crane according to claim 1, wherein the reduction of the rotation speed in the command as effected by the control units controls the torques generated in the motors of the respective travel devices to be substantially even.

11. The crane according to claim 1, wherein the control units effect the reduction of the rotation speed in the command only when the ratio of the torque measured by the torque measurement unit is greater than 100% with respect to the rated torque of the motor to which the inverter is connected.

12. The method of controlling the crane according to claim 4, wherein a center of gravity of the crane is offset to be closer to one of the travel devices than the other.

13. The method of controlling the crane according to claim 4, wherein the reduction of the rotation speed in the command as effected by the inverters controls the torques generated in the motors of the respective travel devices to be substantially even.

14. The method of controlling the crane according to claim 4, wherein the inverters effect the reduction of the rotation speed in the command only when the ratio of the torque measured by the torque measurement unit is greater than 100% with respect to the rated torque of the motor to which the inverter is connected.

* * * * *